D. R. BIRD.
SAFETY TRAP.
APPLICATION FILED JULY 3, 1915.
1,192,265.
Patented July 25, 1916.
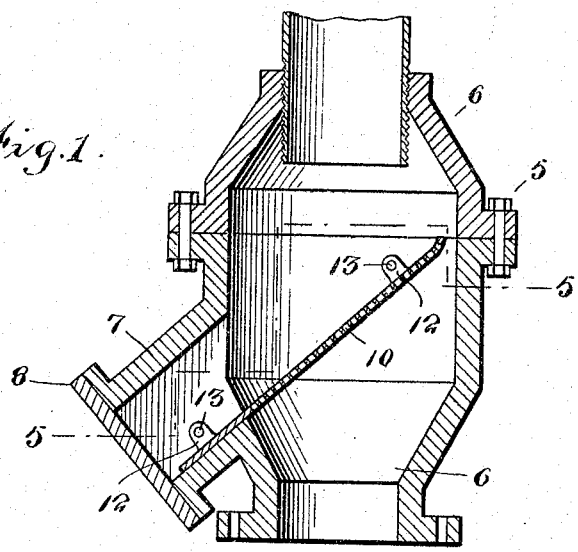
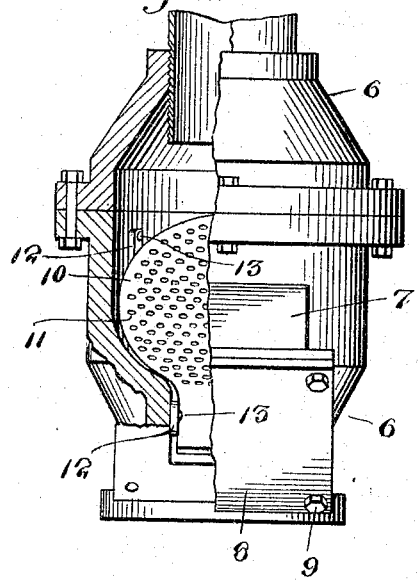
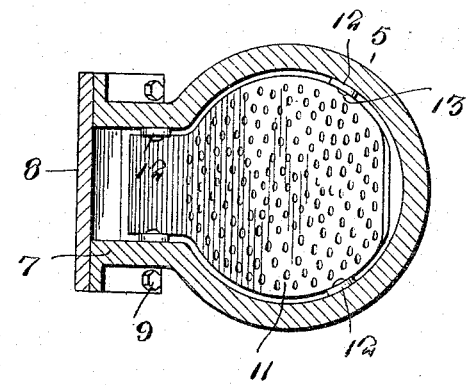
Inventor
D. R. Bird
By Victor J. Evans
Attorney
Witnesses

UNITED STATES PATENT OFFICE.

DAVE R. BIRD, OF PINELAND, TEXAS.

SAFETY-TRAP.

1,192,265.

Specification of Letters Patent.

Patented July 25, 1916.

Application filed July 3, 1915. Serial No. 37,916.

*To all whom it may concern:*

Be it known that I, DAVE R. BIRD, a citizen of the United States, residing at Pineland, in the county of Sabine and State of Texas, have invented new and useful Improvements in Safety-Traps, of which the following is a specification.

The invention relates to a safety trap, and more particularly to the class of steam valve safety traps.

The primary object of the invention is the provision of a safety trap of this character wherein broken rings or other heavy and hard particles or substances will be trapped so as to avoid interference with the flow of the steam, and also prevents any possibility of the imperfect working of the machinery operated by the same.

Another object of the invention is the provision of a safety trap of this character wherein the same can be readily and easily cleaned with despatch, thus avoiding the choking of the steam valve or of the lead therefor, or the possibility of damage thereto while in operation.

A further object of the invention is the provision of a safety trap of this character wherein the valves are protected so as to avoid the ineffectiveness of the same whereby the control of a machine operated by fluid passing through the valve can be had at all times, and thus assuring perfect working of the machine.

A still further object of the invention is the provision of a safety trap of this character which is simple in construction, reliable and efficient in operation, and inexpensive in manufacture and installation.

With these and other objects in view, the invention consists in the construction, combination and arrangement of parts as will be hereinafter fully described, illustrated in the accompanying drawings, and pointed out in the claim hereunto appended.

In the drawings: Figure 1 is an enlarged vertical sectional view thereof. Fig. 2 is a fragmentary sectional elevation of the trap. Fig. 3 is a sectional view on the line 5—5 of Fig. 1.

Similar reference characters indicate corresponding parts throughout the several views in the drawings.

Referring to the drawings in detail, the safety trap comprises a two-part shell or casing 5 having contracted or restricted ends 6 connected respectively to sections of the steam pipe at a point between a valve casing and cylinder, the shell or casing 5 being formed at one side with a trapping extension 7 which is disposed at an angular inclination relative to the shell or casing, and is closed through the medium of a removable cap plate 8 which, in this instance, is detachably fastened thereto through the medium of bolts 9, although the said plate can be secured in any other suitable manner so that access may be had to the trap extension 7 with despatch.

Arranged within the shell or casing 5 and angularly disposed therein is a strainer plate 10 having a series of perforations 11 for the free passage of steam through the pipe from the valve casing to the cylinder. One end of the strainer plate 10 protrudes into the trap extension 7, and this end and the said strainer plate are formed with suspension ears 12 at opposite sides thereof for receiving rivets 13 which connect the strainer plate to the wall of the shell or casing 5, as shown. The particular disposition of the strainer plate 8 within the shell or casing 5 places the said plate in a position for intersecting the passage through the shell or casing 5, while the perforations 11 therein will not retard the free passage of the steam therethrough, yet the strainer plate 10 will deflect broken rings or hard particles or substances into the trap extension 7 so as to prevent the deposit thereof in the valve casing, which would result in the ineffectiveness of the feed valve therein, and thereby cause the imperfect working of the machinery operated by the steam. When deposits have been made in the trap extension 7 the cap 8 can be readily removed so that such deposits can be taken therefrom.

What is claimed is:—

A safety trap comprising a shell having an inlet and outlet in alinement with each other and also provided with a downwardly inclined branch nipple in one side thereof at a point between the inlet and outlet to form a trap, a closure plate for said branch nipple and detachable therefrom, and a foraminous plate having ears at its opposite edges secured to opposite sides of the shell for holding the foraminous plate inclined in the direction of the branch nipple, the lowermost end of said plate being extended into the nipple.

In testimony whereof I affix my signature in presence of two witnesses.

DAVE R. BIRD.

Witnesses:
W. L. EFFINGER,
JOEL SMITH.

Copies of this patent may be obtained for five cents each, by addressing the "Commissioner of Patents, Washington, D. C."